US010689521B2

(12) United States Patent
Burgess et al.

(10) Patent No.: US 10,689,521 B2
(45) Date of Patent: Jun. 23, 2020

(54) LOW DENSITY UV-CURABLE OPTICAL FIBER COATING, FIBER MADE THEREWITH, AND METHOD OF FIBER MANUFACTURE

(71) Applicant: OFS Fitel, LLC, Norcross, GA (US)

(72) Inventors: David Burgess, Springfield, MA (US); Adam Hokansson, Granby, CT (US); Debra A Simoff, Simsbury, CT (US); Andrei A Stolov, Simsbury, CT (US); Jacob Wrubel, Storrs Mansfield, CT (US)

(73) Assignee: OFS FITEL, LLC, Norcross, GA (US)

( * ) Notice: Subject to any disclaimer, the term of this patent is extended or adjusted under 35 U.S.C. 154(b) by 159 days.

(21) Appl. No.: 15/527,057

(22) PCT Filed: Nov. 18, 2015

(86) PCT No.: PCT/US2015/061265
§ 371 (c)(1),
(2) Date: May 16, 2017

(87) PCT Pub. No.: WO2016/081557
PCT Pub. Date: May 26, 2016

(65) Prior Publication Data
US 2018/0282550 A1  Oct. 4, 2018

Related U.S. Application Data

(60) Provisional application No. 62/081,393, filed on Nov. 18, 2014.

(51) Int. Cl.
*C09D 4/00* (2006.01)
*C09D 133/14* (2006.01)
*G02B 6/02* (2006.01)
*C09D 133/08* (2006.01)
*C09D 135/02* (2006.01)
*C09D 153/00* (2006.01)

(52) U.S. Cl.
CPC ............. *C09D 4/00* (2013.01); *C09D 133/08* (2013.01); *C09D 133/14* (2013.01); *C09D 135/02* (2013.01); *C09D 153/00* (2013.01); *G02B 6/02* (2013.01); *G02B 6/02395* (2013.01); *C08L 2312/06* (2013.01)

(58) Field of Classification Search
CPC ...... C09D 4/00; C09D 133/08; C09D 133/14; C09D 135/02; C09D 153/00; G02B 6/02; G02B 6/02395; C08L 2312/06

USPC .......................................................... 427/162
See application file for complete search history.

(56) References Cited

U.S. PATENT DOCUMENTS

| 5,146,531 | A | * | 9/1992 | Shustack | ............... C03C 25/106 385/128 |
| 5,352,712 | A | | 10/1994 | Shustack | |
| 6,579,914 | B1 | | 6/2003 | Gantt et al. | |
| 6,603,901 | B1 | | 8/2003 | Hale et al. | |
| 6,658,185 | B2 | * | 12/2003 | Bosisio | ............... G02B 6/4407 385/109 |
| 2003/0021565 | A1 | | 1/2003 | Khudyakov et al. | |
| 2009/0274424 | A1 | | 11/2009 | Debut et al. | |
| 2012/0128313 | A1 | * | 5/2012 | Wu | ..................... C03C 25/1065 385/141 |
| 2013/0011108 | A1 | | 1/2013 | Weimann et al. | |

FOREIGN PATENT DOCUMENTS

| EP | 0780712 A2 | 6/1997 |
| JP | S59217654 A | 12/1984 |
| JP | S6121120 A | 1/1986 |
| JP | S6291519 A | 4/1987 |
| JP | H0421546 A | 1/1992 |
| JP | 2000273127 A | 10/2000 |
| JP | 2003226725 A | 8/2003 |
| JP | 2005290065 A | 10/2005 |

OTHER PUBLICATIONS

Extended European Search Report for EP Application No. 15860577.4; Report dated Apr. 6, 2016 (8 pages).
International Search Report for international Application No. PCT/US2015/061265, International Filing Date Nov. 18, 2015, dated May 16, 2016, 3 pages.
Written Opinion for International Application No. PCT/US2015/061265, International Filing Date Nov. 18, 2015, dated May 16, 2016, 8 pages.

* cited by examiner

*Primary Examiner* — Ling Siu Choi
*Assistant Examiner* — Ronald Grinsted
(74) *Attorney, Agent, or Firm* — David Rodrigues; Cantor Colburn

(57) ABSTRACT

Disclosed herein is a composition for coating an optical fiber comprising a free radically curable acrylate and/or a methacrylate functionalized oligomer having a density of less than 1.0 g/cm$^3$; where the acrylate and/or the methacrylate functionalized oligomer has a functionality of 1 or more; a photoinitiator; and optionally a free radically curable acrylate and/or methacrylate diluent monomer that has a density of less than 1.0 g/cm$^3$; where the coating composition is disposed and cured on an optical fiber; where the density of the cured coating is less than 1.0 g/cm$^3$; and where the average functionality of the composition is greater than one.

22 Claims, 1 Drawing Sheet

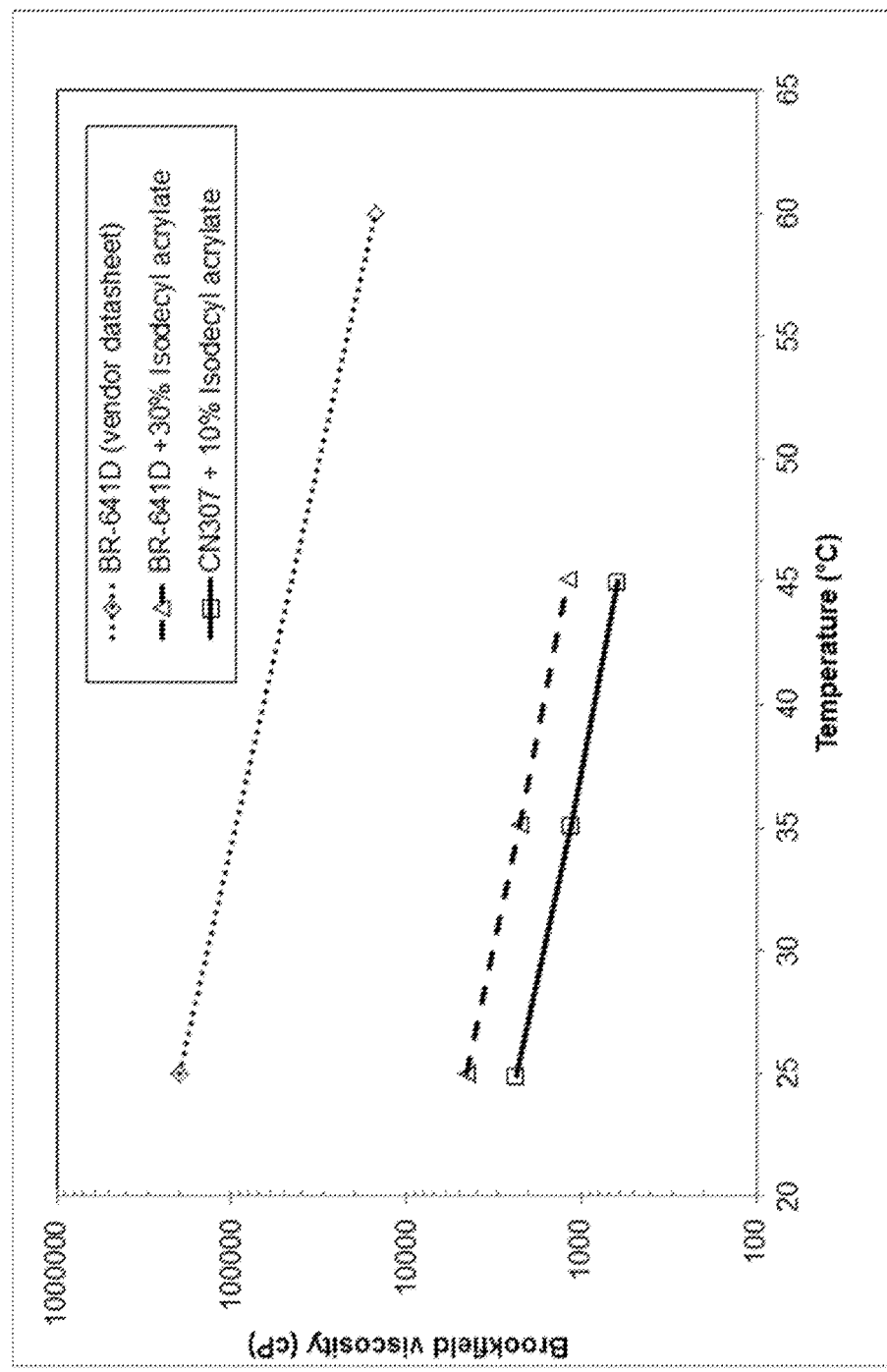

LOW DENSITY UV-CURABLE OPTICAL FIBER COATING, FIBER MADE THEREWITH, AND METHOD OF FIBER MANUFACTURE

CROSS-REFERENCE TO RELATED APPLICATIONS

This application claims priority to U.S. Provisional Application No. 62/081,393 filed on Nov. 18, 2014 the entire contents of which are hereby incorporated by reference.

BACKGROUND

This disclosure relates to a low density ultraviolet (UV)-curable optical fiber coating, fiber made therewith and a method of manufacturing the fiber.

It is sometimes desirable to use optical fibers having reduced density (i.e., reduced weight per unit length) for certain types of telecommunications applications such as, for example, those that require buoyancy for in-water or underwater sensing or guidance, e.g., in towed arrays for underwater acoustic sensing, marine antennas, or in a tethered vehicle (remotely operated underwater vehicle, ROV). They can also aid in the design and construction of buoyant fiber optic cables. Another application may be fibers for airborne fiber optic guided missiles. In general, there is a desire to reduce optical fiber weight in various applications, in order to reduce the energy used for its movement and transport. This includes, for example, fiber for air-blown fiber installation into ducts and fiber used in fluid-filled tubes in oil wells. It is further desirable that optical fiber coatings be UV-curable, so as to facilitate manufacturing of the fiber using well-known techniques.

For a glass optical fiber, the light-guiding component is generally a ceramic such as silica or doped silica, where the silica itself has a density of about 2.2 grams per cubic centimeter ($g/cm^3$). This is significantly greater than water, having a density of about 1.0 $g/cm^3$ (and of course, far heavier than air). To date, most known UV-curable optical fiber coatings have had densities greater than 1.0 $g/cm^3$, i.e., themselves being denser than water. For commercially available UV-curable urethane acrylate optical fiber coatings, a typical primary (inner) coating has a density greater than or equal to 1.05 $g/cm^3$ and a typical secondary (outer) coating has a density greater than or equal to 1.15 $g/cm^3$. Some companies have reported or offered fibers having reduced-density polymer coatings where the reduction in density was achieved by either inducing a foam structure or by incorporating hollow microspheres into the fiber coating. However, a foaming process and the resultant foam density are difficult to control while still achieving geometric (wall thickness) control. Microspheres may settle (or float) in a liquid coating after incorporation and mixing, requiring tedious remixing to sustain uniformity. Microspheres, sometimes called microballoons, can be of a glass type or a polymer type. Glass microspheres, in particular, can be undesirably abrasive and potentially weaken a glass fiber surface by scratching if applied directly adjacent to a glass surface within a polymer coating. In addition, glass or polymer microspheres can also produce undesirable microbending when included in the fiber coating. And in cases where microspheres are incorporated within or on top of an outer coating layer, they tend to reduce the outer coating smoothness. This in turn increases frictional resistance when the fiber is dragged through either air or a fluid such as water, and such drag can be undesirable in certain applications.

Relatively few extrudable non-foamed thermoplastics are known to have densities less than 1.0 $g/cm^3$ (e.g., polymethylpentene and certain types and copolymers of polyolefins such as polypropylene and polyethylene). However, it is difficult to extrude thermoplastics in thin layers in comparison to coating a fiber with a UV-curable resin because thermoplastics usually have higher resistance to flow; e.g., typical thermoplastic melt viscosities are high (greater than 100,000 centipoise) in comparison with the viscosity of a typical UV-curable optical fiber coating (about 4000 centipoise). Hence, use of low-density thermoplastics may limit the smallness of a coated fiber that can be readily achieved. Additionally, for the case of optical fiber coatings that are applied immediately adjacent to a glass surface, the coatings must be filtered to remove abrasive particles having size larger than about 1 micron in order to achieve sufficient fiber strength; such filtration is extremely difficult for resins having the high viscosities of most extrudable thermoplastics.

SUMMARY

Disclosed herein is a composition for coating an optical fiber comprising a free radically curable acrylate and/or methacrylate functionalized oligomer having a density of less than 1.0 $g/cm^3$; a photoinitiator; and optionally one or more free radically curable acrylate and/or methacrylate diluent monomer(s) that each have a density of less than 1.0 $g/cm^3$; where the coating composition is disposed and cured on an optical fiber; where the density of the cured coating is less than 1.0 $g/cm^3$; and where the average functionality of the composition is greater than one.

Disclosed herein too is a method comprising disposing onto an optical fiber a free radically curable acrylate and/or methacrylate functionalized oligomer having a density of less than 1.0 $g/cm^3$; a photoinitiator; and optionally one or more free radically curable acrylate and/or methacrylate diluent monomer(s) that each have a density of less than 1.0 $g/cm^3$; where the coating composition is disposed and cured on an optical fiber; and where the average functionality of the composition is greater than one; and curing the composition using ultraviolet radiation to produce a coating that has a density of less than 1.0 $g/cm^3$.

Further disclosed herein is an optical fiber comprising a cured coating composition. Disclosed herein too is an optical fiber manufactured by the aforementioned method.

BRIEF DESCRIPTION OF THE FIGURES

FIG. 1 is a graph of viscosity versus temperature for some of the coating compositions.

DETAILED DESCRIPTION

Disclosed herein is an optical fiber that has a low density coating disposed upon it. The coating may be a single layer coating or may be part of a dual layer coating. In a preferred application, the fiber has a dual layer coating (a low density primary coating and a secondary coating) disposed upon it. The low density primary coating (hereinafter primary coating) is an ultraviolet (UV)-curable inner layer (that lies between the glass surface, i.e., the glass cladding, and the secondary coating) that is manufactured from hydrocarbon-based (meth)acrylate (i.e., acrylate or methacrylate) oligomers having liquid densities significantly less than 1.0 g/cm³ (e.g., in particular, polybutadiene-based resins). The hydrocarbon-based acrylate or methacrylate oligomers are admixed with one or more free-radical generating photoinitiator(s) and optionally other components (e.g., low-density diluent monomers, as well as adhesion promoters and/or antioxidants). The primary coating and/or the secondary coating is devoid of low-density filler particles such as hollow microspheres. The primary coating and/or the secondary coating is not foamed either. Foaming agents are not used in the manufacturing of the primary coating. The primary coating has a desirable balance of other performance attributes such as viscosity, refractive index, cure speed, adhesion to glass, modulus and other mechanical properties, such as elasticity, strength and elongation.

As a preferred option, disposed on the primary coating is a harder secondary coating (that may form the outer layer of the optical fiber) that facilitates achieving target values of density for the optical fiber. The secondary coating is also preferably UV cured, although a thermoplastic outer coating may optionally be used atop the primary coating.

Disclosed herein too are coating compositions for the primary coating that have a viscosity at room temperature in the range of 1000 to 70,000 centipoise (cP), preferably 2000 to 10,000 cP, and more preferably 3000 to 5000 cP and that have a density of less than 1.0 g/cm³ (in both the liquid state and the cured state) when measured at room temperature (about 23 Celsius). The coating composition comprises hydrocarbon acrylate and/or methacrylate oligomers (e.g., in particular, polybutadiene-based resins) that have densities of less than 1 gm/cm³ (in the liquid state) and whose constituents do not have low flash points (i.e., they are not excessively volatile or flammable). The acrylate or methacrylate oligomers are admixed with one or more free-radical generating photoinitiator(s) and optionally other components (e.g., low-density diluent monomer(s) and/or oligomer(s)), as well as adhesion promoters and/or antioxidants). Depending upon the oligomer viscosity and the desired coating properties, the formulations may be tailored by blending the acrylate and/or methacrylate oligomers with other acrylate or methacrylate diluent monomers or oligomers (hereinafter diluent species) that can copolymerize with the acrylate and/or the methacrylate oligomers in a free-radical polymerization reaction.

Here "(meth)acrylate" refers to either an acrylate or a methacrylate functionality. The (meth)acrylate has the structure shown in formula (A)

(A)

wherein in formula (A), $R_5$ is H or a $C_{2-10}$ alkyl and $R_4$ represents the oligomer to which the acrylate or methacrylate group is attached, including the low-density oligomer backbone and any intervening linking or bridging groups, which may include for example, urethane, epoxy, alkyl, hydroxy alkyl, carbonate, ester, or a combination thereof. In an exemplary embodiment, $R_5$ is a hydrogen or a methyl group.

Acrylate functional monomers and oligomers are preferred in comparison to methacrylate functional monomers and oligomers based on propensity for higher cure speeds and lower density. Methacrylate functionalities should preferably be used in a mole fraction of less than 0.5, based on the combined molar amounts of acrylate and methacrylate reactive groups. The acrylate functional monomers and oligomers generally have a functionality of 1 or more and preferably 1 to 2.

The acrylated or methacrylated oligomers are preferably those that have a density of less than 1.0 g/cm³ and where a dominant portion of the oligomer is aliphatic hydrocarbon in nature, i.e., comprising primarily carbon and hydrogen atoms. These oligomers may be selected from urethane (meth)acrylates, epoxy (meth)acrylates, polybutadiene (meth)acrylates, polybutadiene urethane (meth)acrylates, polybutadiene epoxy (meth)acrylates, polyisoprene (meth)acrylates, polyisoprene urethane (meth)acrylates, polyisoprene epoxy (meth)acrylates, hydrocarbon (meth)acrylates, hydrocarbon urethane (meth)acrylates, hydrocarbon epoxy (meth)acrylates, hydrophobic (meth)acrylate esters, hydrophobic urethane (meth)acrylate esters, hydrophobic epoxy (meth)acrylate esters, pentadiene (meth)acrylates, pentadiene urethane (meth)acrylates, pentadiene epoxy (meth)acrylates, and the like, or a combination thereof.

These oligomers may be selected from those having backbones including polybutadiene, substituted polybutadiene (including oligomers of 2-methyl-1,3-butadiene, i.e., isoprene), polypentadiene, polycyclopentadiene, hydrogenated variants of the foregoing dialkene oligomers, polyisobutylene, and the like, or a combination thereof. The diene-based oligomer backbones may encompass various types of isomers (i.e., those having different spatial conformations, stereoregularity, tacticity, and so forth). The oligomers further contain one or more reactive functional groups selected from (meth)acrylates, hydroxy alkyl (meth)acrylates, epoxy (meth)acrylates, urethane (meth)acrylates, ester(meth)acrylates, carbonate (meth)acrylates, and the like, or a combination thereof, where the one or more functional groups may be disposed either at the end(s) of an oligomer backbone or along the oligomer backbone. The oligomers are liquids having viscosities less than about 100,000 centipoise (cP) and preferably less than about 10,000 cP at 23° C.

The acrylate or methacrylate functional groups in the acrylated or methacrylated oligomers are generally end-groups that are reacted to the oligomer backbone; however the acrylate or methacrylate moieties can be disposed as side groups along the backbone in some oligomer architectures. The oligomer backbone is generally a hydrocarbon containing backbone that has a density of less than 1.0 g/cm³ at room temperature. The hydrocarbon containing backbone preferably comprises aliphatic hydrocarbons, cycloaliphatic hydrocarbons, or a combination thereof, so long as the coating composition with the oligomers present has a density of less than 1.0 g/cm³ at room temperature. While other organic moieties may be present in the oligomer as repeat units or as parts of repeat units (such as, for example, aromatic groups, repeat units having ether linkages, and the like), it is desirable for these organic moieties to not increase the density of the coating composition to a value greater than 1.0 g/cm³ at room temperature. It is also desirable for the oligomers to be present in the composition in an amount effective to maintain the composition viscosity at less than 100,000 cP. In general, repeat units that contain aliphatic or cycloaliphatic hydrocarbon groups are preferred over repeat units that contain aromatic groups.

Examples of hydrocarbon containing backbones are polymers of butadiene, isoprene, pentadiene, cyclopentadiene, hydrogenated variants of butadiene, isoprene, pentadiene, cyclopentadiene, isobutylene, or a combination thereof. The hydrocarbon containing backbones of the oligomers may be homopolymers or copolymers such as block copolymers, star block copolymers, random copolymers, alternating copolymers, and graft copolymers. Dendrimers may also be used if desired in the formulations. Blends of two or more homopolymers or of two or more copolymers may be used. Blends of homopolymers with copolymers may also be used. Copolymers with other monomers such as styrene, acrylonitrile, or vinyl acetate may also be employed in limited amounts, such that they do not excessively raise the coating density.

The acrylated or methacrylated hydrocarbon oligomers may be used with backbones in any of their stereoselective forms (cis, trans, or a combination thereof), structural isomeric forms [e.g., poly(1,2-butadiene), poly(1,4-butadiene), poly(1,4-isoprene), poly(3,4-isoprene), or a combination thereof), physical forms (amorphous or semi-crystalline), tactic forms (atactic, syndiotactic, isotactic, or a combination thereof) or copolymers thereof or other combinations thereof (e.g. blends).

When, for example, a polybutadiene (meth)acrylate is used as the oligomer, the polybutadiene backbone may comprise 1,2-butadiene, 1,4-butadiene, or a combination thereof. The 1,4-butadiene may be in either cis- or trans-form. Similarly, for polyisoprene backbones, oligomers derived from cis-1,4-polyisoprene, trans-1,4-polyisoprene, 1,2-polyisoprene, 3,4-polyisoprene, or a combination thereof may be used. Amorphous forms of the oligomers are preferred. Irrespective of the form of the oligomer used, it is desirable for the coating composition containing the oligomer to have a density of less than 1.0 g/cm$^3$ and a viscosity of less than 100,000 cP.

Exemplary structures for exemplary oligomers are shown below in the formulas (1) to (10).

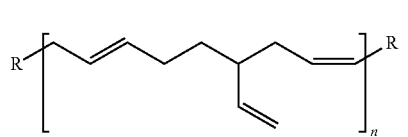
(1)

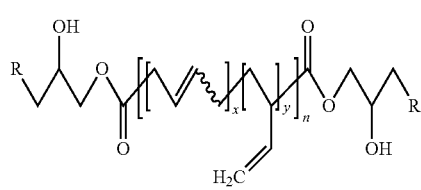
(2)

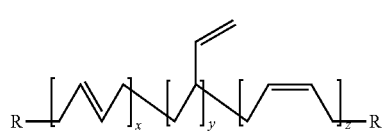
(3)

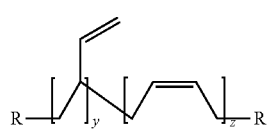
(4)

(5)

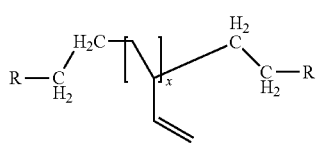
(6)

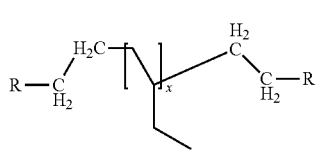
(7)

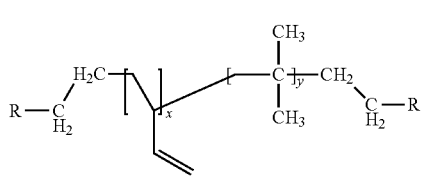
(8)

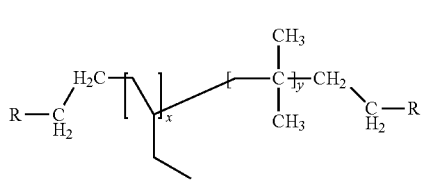
(9)

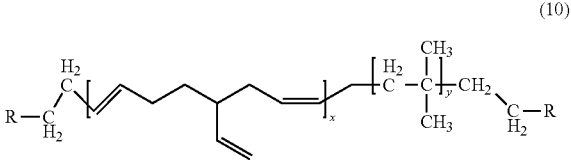
(10)

where in formulas (1)-(10), R contains a structure represented by formulas (11)-(13) below

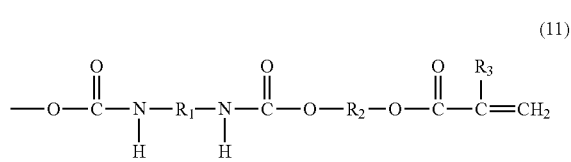
(11)

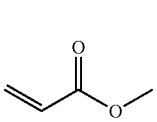
(12)

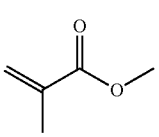
(13)

where $R_1$ and $R_2$ are independently a $C_{2-10}$ alkyl, branched alkyl, cycloaliphatic group, an aromatic group one or more of the carbon atoms are substituted, $R_3$ is a hydrogen or a methyl group. An exemplary structure for R (where $R_1$ is a methylphenyl) is shown in the formula (14) below.

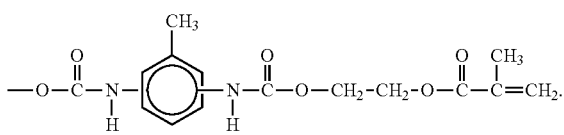

(14)

While the number of repeat units in the formulas (1) to (10) are not explicitly shown here, the oligomers are used in the composition in an amount effective to produce a composition viscosity of less than 100,000 cP, having an elongation after cure of greater than 10%, a modulus of elasticity after cure of 0.5-100 MPa, and a density of less than 1.0 g/cm$^3$.

Examples of the acrylate or methacrylate oligomers are shown in the Table 1 below. These include Bomar™ BR-640D and BR-641 D, which are polybutadiene (PBd) urethane acrylate oligomers having a functionality of two (sold by Dymax Corporation). Note, the values given in Table 1 for strength, elongation, and glass transition temperature for the two Bomar oligomers were reportedly measured for cured films using an admixture of the respective oligomer with 30 weight percent isobornyl acrylate and 2 weight percent of a photoinitiator.

Other suitable coating components are members of a family of hydrocarbon-based oligomers sold by Sartomer. Per Sartomer's product literature, CN301, CN303, and CN307 are polybutadiene-based oligomers. The CN 301 and CN303 are dimethacrylates and CN307 is a diacrylate type. CN301 also reportedly contains 20% of the diluent monomer hexane diol diacrylate. In contrast, Sartomer CN308 and CN309 are described as hydrophobic acrylated ester oligomers having a fully saturated backbone. CN9014 oligomer is reportedly a hydrophobic aliphatic urethane acrylate whose backbone is also fully saturated.

Another exemplary oligomer is BAC-45 described as hydroxy terminated polybutadiene diacrylate (manufactured by Osaka Organic Chemical Industry Ltd., OCC) and having the following structure (15):

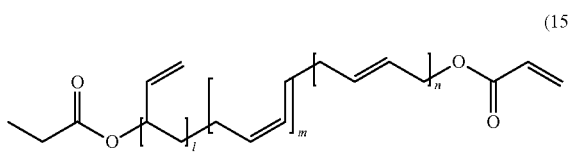

(15)

San Esters (a joint venture led by OCC) has introduced a newer type of oligomer product as being polyisoprene-diacrylate (PIPA) from OCC having the structure (16):

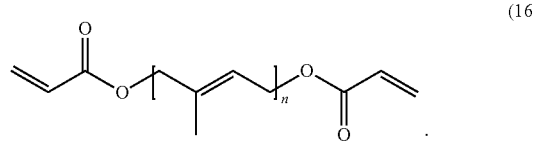

(16)

Other candidate oligomers described in the literature whose generic chemistries are conceptually useful for creating a low-density coating are, for example, 1,2-polybutadiene-terminated urethane(meth)acrylate (e.g. NISSO-PB TE-2000 and TEA-1000 manufactured by Nippon Soda Co., Ltd.); a hydrogenated product of the above polybutadiene (meth)acrylate (e.g., NISSO-PB TEAI-1000 manufactured by Nippon Soda Co., Ltd.); however the viscosities of these particular NISSO-PB oligomers are undesirably high (100,000 to 400,000 cP at 45° C.), rendering them difficult to process into usable optical fiber coating formulations. The structure of TE-2000 is depicted by Nippon Soda as:

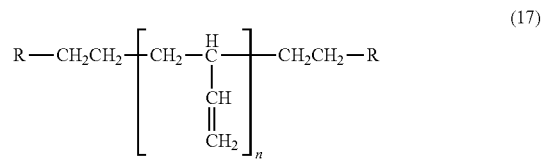

(17)

where R has the structure of formula (14) shown above as well as below:

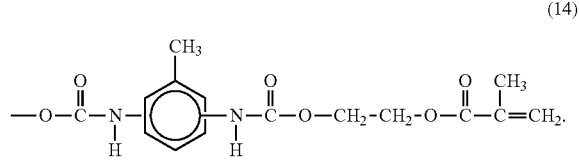

(14)

The structure of TEAI-1000 is similarly depicted by Nippon Soda as:

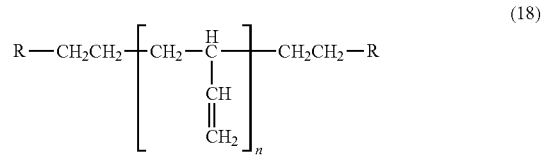

(18)

where R has the structure of formula (19)

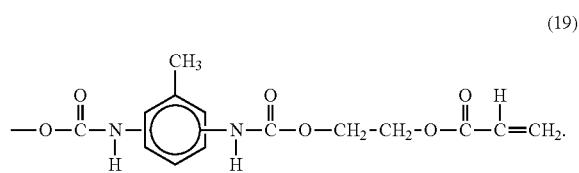

(19)

The acrylate or methacrylate oligomers are used in amounts of 60 to 99 wt %, preferably 70 to 95 wt %, and more preferably 80 to 95 wt %, based on the total weight of the composition prior to curing.

The composition may also contain aliphatic hydrocarbon diluent monomers that are used to adjust viscosity and to support the achievement of a primary coating having a density of less than 1.0 g/cm$^3$. These diluents comprise primarily monofunctional alkyl acrylate or monofunctional alkyl methacrylate monomers. The diluent monomers are selected based upon a number of criteria, including their capacity to impart relatively low density when cured, their liquid-phase compatibility with the acrylate or methacrylate oligomers, their tendency to be amorphous at room temperature, their capability to impart an overall post-cure refractive index of the formulation greater than that of silica (i.e., greater than 1.45 after cure, at a wavelength of 850 nm), and their having sufficiently high flash points (greater than 70° C.) so as to limit flammability during processing. Monomers with types of substituents other than aliphatic hydrocarbon can be used in limited amounts as long as they can be co-polymerized efficiently with free radical initiators and do not result in a final (cured) primary-coating density greater than 1.0 g/cm$^3$. Examples of such diluent monomers are (meth)acrylated co-monomers that have substituents based on aromatic hydrocarbons, aliphatic polyethers, and aliphatic amides or (meth)acrylate monomers having functionality greater than one. Non-acrylated N-vinyl monomers such as N-vinyl pyrrolidone and N-vinyl caprolactam can also be used in limited amounts, due to their relatively high reactivity in free radical polymerization.

Among the preferred aliphatic hydrocarbon substituents, linear or branched types are especially preferred, although cyclic hydrocarbon substituents can be used in limited amounts. Acrylates are preferred vs. methacrylates based on their reactivity. The alkyl groups (in the alkyl acrylates or alkyl methacrylates) generally have 8 or more carbon atoms. The alkyl chains may be linear or branched. Examples of the alkyl groups are octyl, nonyl, decyl, undecyl, dodecyl, isooctyl, isodecyl, tridecyl, lauryl, and combinations, or the like. Particularly preferred monofunctional diluents are lauryl acrylate and isodecyl acrylate. Examples of useful alkyl acrylates are shown in the Table 2 below. It is to be noted that after the addition of the diluent monomers to the oligomers, the average functionality of the composition must be greater than 1. Additionally, if methacrylate-functional monomers or oligomers are used, the mole ratio of methacrylate to acrylate functional groups in the coating composition must be less than 0.5.

In Table 2, values for specific gravity of the uncured liquids were obtained from vendor technical datasheets or other public literature. The values for specific gravity for the cured homopolymers were estimated from empirical relationships using a method described by Sartomer (Reference: "Shrinkage of UV Monomers," Application Bulletin, Sartomer USA, LLC.) as follows:

Specific gravity,cured homopolymer=100*(specific gravity,liquid)/(100−cure shrinkage) where for monofunctional acrylates the maximum cure shrinkage can be estimated by shrinkage (%)≈−1.38+2668*(monomer specific gravity)/(monomer molecular weight).

Additionally, for the specific gravity of the cured homopolymer of lauryl acrylate, reported literature values were found to be in the range 0.93-0.99 (References: Zoltowski et al, Langmuir 2007, 23, 5522-5531; Olagoke Olabisi, Kolapo Adewale, Handbook of Thermoplastics, CRC Press, Mar. 19, 1997). It is to be noted that the terms density and specific gravity have been used interchangeably in the tables and in the text. Some vendors report data in specific gravity while others report it in density, but all are interpreted to be values for density at room temperature (~23° C.). It is further to be noted that some vendors report their products in terms of density but then the equation above may be changed accordingly.

The monofunctional diluents are used in amounts of 1 to 40 wt %, 5 to 30 wt % and 5 to 20 wt %, based on the total weight of the composition prior to curing.

TABLE 1

| Vendor | Material | Description | Specific Gravity (liquid) | Viscosity @ 25° C. (centipoise) | Modulus @ 25° C. (megapascal) | Elongation @ 25° C. (%) | Refractive Index (liquid) | Glass Transition Temperature, Tg (° C.) | (Meth)acrylate Functionality |
|---|---|---|---|---|---|---|---|---|---|
| CVC Thermoset Specialties | Hypro ™ 2000X168LC VTB | Methacrylate (Vinyl) Terminated Polybutadiene | 0.929 | 80,000 @ 27° C. | | | | −80 | 1.9 |
| Dymax | BR-640D | Bomar ™ hydrophobic urethane acrylate | 0.94 | >>9000 (9000 cP @ 50° C.) | 4 | 190 | 1.48 | 33 | 2 |
| Dymax | BR-641D | Bomar ™ hydrophobic urethane acrylate | 0.93 | >15,000 (15,000 cP @ 60° C.) | 5 | 320 | 1.48 | −20 | 2 |
| Sartomer | CN301 | Polybutadiene dimethacrylate | 0.961 | >>1000 (1000 cP @ 60° C.) | 48 | 15 | 1.51 | −44 | 2.5 |
| Sartomer | CN303 | Polybutadiene dimethacrylate | 0.967 | >>4000 (4,125 cP @ 60° C.) | 2.8 | 49 | 1.52 | −35 | 2.5 |
| Sartomer | CN307 | Polybutadiene diacrylate; Hydrophobic acrylate ester | 0.95 | 8000 | 1.4 | 43 | 1.50 | −17 | 2 |
| Sartomer | CN308 | Hydrophobic acrylate ester | 0.87 | 6000 | 3.8 | 19 | 1.48 | −25 | 2 |
| Sartomer | CN309 | Hydrophobic acrylate ester | 0.92 | 150 | 23 | 5 | 1.47 | 11 | 2 |
| Sartomer | CN9014 | Hydrophobic aliphatic urethane acrylate | 0.93 | >>19,000 (19,000 cP @ 60° C.) | 3.5 | 106 | 1.48 | −20 | 2 |
| San Esters | BAC-45 | Polybutadiene diacrylate | 0.9-1.0 | 4000 to 8000 | | | 1.51-1.52 | | 2 |

TABLE 2

| Supplier | Product ID | Description | Refractive index (liquid) | Specific gravity (liquid) | Shrinkage (estimated) | Specific Gravity (cured, estimate) | Glass transition temperature, Tg (° C.) | Molecular Weight | Flash point (° C.) | Viscosity @ 25° C. (centipoise) |
|---|---|---|---|---|---|---|---|---|---|---|
| Sartomer | SR440 | Isooctyl Acrylate | 1.4346 | 0.880 | 11.4 | 0.993 | −54 | 184 | 81 | 5 |
| Sartomer | SR484 | Octyl/Decyl Acrylate | 1.4371 | 0.880 | 10.2 | 0.979 | | 203 | >100 | 4 |
| Sartomer | SR395 | Isodecyl Acrylate | 1.4395 | 0.881 | 9.7 | 0.976 | −60 | 212 | 109 | 5 (<10) |
| Sartomer | SR335 | Lauryl Acrylate | 1.4416 | 0.875 | 8.3 | 0.955 (literature reported values 0.93-0.99) | −30 | 240 | >94 | 6 (4-8) |
| Sartomer | SR489D | Tridecyl Acrylate | 1.4474 | 0.881 | 7.8 | 0.956 | −55 | 255 | 132 | 7 |
| BASF | LA 1214 | Lauryl acrylate 1214 | | 0.870 | 7.7 | 0.943 | | 240.4 and 268.4 | | <5 |

Photoinitiators may be used in amounts effective to render UV curing capability. The photoinitiators are of a free radical type for curing acrylates and/or methacrylates. The free radical photoinitiators can be aromatic type or aliphatic type. Aromatic free radical photoinitiators are preferably used at 0.3 to 4 wt %, based on the total weight of the coating composition. Exemplary aromatic free radical type photoinitiators are IRGACURE® 819, IRGACURE TPO, IRGACURE 1173, IRGACURE 4265, and IRGACURE TPO-L (commercially available from BASF). The composition may further comprise an optional silane coupling agent that facilitates bonding of the coating composition to the optical fiber during application and after curing of the composition to form the coating. It is therefore desirable for the silane coupling agent to have at least one alkoxy silane group capable of condensation to form a Si—O—Si bond with the optical fiber. Examples of suitable silanes for free radical curing formulations are γ-methacryloxypropyltrimethoxysilane, γ-acryloxypropyltrimethoxysilane, γ-methacryloxypropyltris(β-methoxyethoxy)silane, γ-acryloyloxypropyltris(β-methoxyethoxy)silane, γ-mercaptopropyltrimethoxysilane, and γ-mercaptopropyltriethoxysilane. A preferred silane coupling agent for free radical curing systems is γ-acryloyloxypropyltrimethoxysilane.

The silane coupling agent may be used in amounts of 0.5 to 3 weight percent (wt %), based on the total weight of the coating composition. In a preferred embodiment, the silane coupling agent may be used in amounts of 1.0 to 2.0 weight percent (wt %), based on the total weight of the coating composition.

The composition may further comprise one or more of the following additives: an initiator, an antioxidant, thermal stabilizers, UV stabilizers, surface-tension modifying additives, slickness agents, or a combination comprising at least one of the foregoing additives. Preferred additives are photoinitiators and shelf life stabilizers.

The composition may be blended manually or by simple mixing on e.g., magnetic stir plates, or by tumble rolling, or in larger volume with e.g., a propeller blade on a rotating stir shaft. Heat may or may not be needed. Heating is needed in cases where the components are not liquid at room temperature or where viscosities are too high. The composition is typically filtered to remove particulates less than 1 micrometer in size and then disposed onto an optical fiber and subjected to curing or crosslinking. Most of these coatings can be readily applied using pressurized coating applicators as is widely known in the industry for optical fiber coatings. The compositional ingredients prior to crosslinking also each have relatively low volatility at atmospheric pressure, to allow stable processing while coating optical fibers. Their "flash point" values are generally greater than or equal to 70° C., preferably greater than or equal to 100° C. The coating composition has a viscosity prior to crosslinking of 1000 to 100,000 cP, preferably 2000, to 20,000, and more preferably 3,000 to 5,000 cP. The coating composition contains very low levels of particulate matter (e.g. gel particles) and may be filterable using sieve sizes of less than 2 micrometer (μm), preferably less than or equal to about 0.8 μm. It is desirable for the coating composition to have a shelf life of greater than or equal to 6 months, preferably greater than or equal to 1 year.

Crosslinking is generally conducted using electromagnetic radiation. Electromagnetic radiation includes ultraviolet (UV) radiation, microwave radiation, electron beam radiation, or a combination thereof. A preferred form of radiation for crosslinking the composition is ultraviolet radiation having a wavelength of 100 to 400 nanometers, preferably 200 to 365 nanometers. The ultraviolet radiation may be a combination of ultraviolet A, ultraviolet B, ultraviolet C radiation, or a combination comprising at least one of the foregoing forms of ultraviolet radiation. The crosslinking of the composition may be conducted using a UV radiation dosage having an energy density of 0.05 to 15 joule per square centimeter ($J/cm^2$) after it is disposed onto an optical fiber. In an exemplary embodiment, the coating composition may be cured using a UV radiation dosage having an energy density of less than 10 $J/cm^2$ and preferably less than 1 $J/cm^2$. The curing may be conducted in the presence of an inert gas such as nitrogen, argon, xenon, or a combination comprising at least one of the foregoing inert gases.

The cured primary coating has a refractive index that can be tailored to be higher or lower than the refractive index of the glass substrate of the optical fiber. Typically, the refractive index of the primary coating is about 1.48, which is significantly greater than that of silica. This allows the coating to guide away errant light that might leak from the optical fiber core(s) during bending. A cured film of the primary coating displays an elongation to break that is greater than that of fiber-optic grade silica (greater than 5%, preferably greater than 15%). The primary coatings have densities of less than 1.0 $g/cm^3$ at room temperature after cure, preferably less than 0.95 $g/cm^3$ and most preferably less than 0.91 g/cm³. When cured the coating may have a refractive index of about 1.46 to about 1.50 and displays an elongation to break of greater than 15% and an elastic modulus at 23° C. of 0.3 to 100 megapascals, more typically 1 to 10 megapascals.

The coating compositions disclosed herein offer lower densities than conventional commercially available optical fibers. The coatings can be tailored to display increased coating/glass adhesion, for increased mechanical robustness in harsh or hot/humid environments. The coatings have a relatively low amine content as well as a low hydroxyl content (when compared with other commercial urethane acrylate optical fiber coatings), which permits them to be resistant to moisture and also to display very low corrosivity to silica. The coating composition, the coatings and fibers derived therefrom are exemplified by the following non-limiting examples.

EXAMPLES

This example was conducted to demonstrate selected oligomers and monomers that could be used to produce a cured primary coating having a density of less than 1.0 g/cm³. A series of formulations was prepared and examined for viscosities and for refractive index, modulus, and density values after cure. Viscosities were measured using a Brookfield DV-II viscometer fitted with a Small Sample Adapter (SC4-21 spindle and SC4-13R removable chamber) using a circulating water bath to control temperature. Table 3 shows the different formulations that were made for these examples. The FIG. 1 shows viscosity versus temperature for formulations manufactured using BR-641D or using CN307 (which are detailed in Table 1).

In order to measure densities of the cured coatings, liquid resins were first UV-cured on glass plates using a UVPS benchtop conveyorized curing station fitted with a mercury lamp (UV dose 1 J/cm², film thickness of about 250 microns). Densities were measured using a volumetric displacement method and water at room temperature as follows. A 50 milliliter volumetric flask was rinsed, dried and massed prior to making the measurements. Distilled water was added to the flask until the meniscus reached the volume mark; the mass of the water required was recorded. The flask was then rinsed with acetone and dried again. Next, several strands of cured polymer were inserted into the flask and their mass was recorded, typically amounting to about 1.0 gram. Care was taken to ensure dense packing to reduce the possibility of air bubbles later. Once the mass of the polymer sample was recorded, water was again added until the meniscus reached the volume mark; the amount of water required was again recorded. Assuming the density of water to be 1 gram per milliliter, the density of the cured samples was calculated according to $$\rho_{coating} = \frac{m_{sample}}{m_{H2O,i} - m_{H2O,f}} \times \rho_{H2O} = \frac{m_{sample}}{m_{H2O,i} - m_{H2O,f}} \times 1 \text{ g/cm}^3$$

where $m_{H2O,i}$ and $m_{H2O,f}$ denote the mass (and hence volume) of water required to reach the volume mark in the empty flask, and the flask with sample, respectively. This difference represents the volume occupied by the sample. Measurements were taken in replicate to increase the accuracy of the method. Samples 1-8 were all found to have densities less than one gram per cubic centimeter (0.877 to 0.944 g/cm³).

Refractive index values for selected films were measured at room temperature and at three wavelengths using a Metricon Model 2010 prism coupler. Dynamic elastic modulus was measured for selected films using a Rheometrics RSA-2 dynamic mechanical spectrometer at 23° C. at a cyclic strain rate of 1.0 radians per second.

Hypothetical fiber designs were modelled using different input values for geometries (glass, primary and secondary coating outer diameters) and for densities. The results are shown in the Table 4.

In certain examples, an 80-micron glass optical fiber was designed having a dual-layer coating (including a reduced-density primary coating) with an overall outer coating diameter of about 250 microns and having an average fiber density of about 1.10 g/cm³. For example, Fiber Design 8 utilized a primary coating density of 0.950 g/cm³ and a primary coating diameter of 230 microns resulting in a computed overall fiber density of 1.109 g/cm³. In comparison, Reference 2 optical fiber having the same geometry and a conventional higher-density (1.105 g/cm³) primary coating was predicted to provide a higher overall fiber density of 1.183 g/cm³. In further comparison, a conventional telecommunications fiber having a glass diameter of 125 microns (also with a dual-layer coating having an outer coating diameter of 250 microns, and with conventional higher-density primary coating) was modelled to have an even higher density of about 1.377 g/cm³.

Several fibers were drawn with low density primary coatings (on two different industrial tower facilities) having nominal fiber and coating diameters of 80 micrometer glass, 250 micrometer secondary coating, and with primary coating diameters in the range 205 to 221 micrometers. The results are detailed in Table 5. The fibers utilized primary coating formulations having recipes taken from Table 3, together with KlearShield 2-002 secondary coating (Momentive UV Coatings) and a single-mode preform. To measure the density of fiber samples, fiber lengths of two to ten meters were collected from the tower during the draw run. When collecting the samples, the instantaneous coating geometries (most importantly, outer diameter) were recorded. The length of each sample was measured to within 1 centimeter. Then the mass of the fiber sample was measured and recorded. The volume of the fiber sample, V, was calculated as $$V = \pi l (OD/2)^2$$

where OD is the outer diameter of the secondary coating for the sample, and l is the measured length of the sample. Then, the density of the fiber sample was computed using $$\rho = \frac{m}{V}.$$

In a first trial, several hundred meters of resultant fiber were obtained using a primary coating having the recipe of Sample 5 (Table 3) and producing a measured overall fiber density of about 1.11 g/cm³. Subsequent trials included the recipes of Sample 5, Sample 8, and Sample 9, producing greater than 1 km of fiber in each case, and resulting in overall fiber densities in the range of 1.082 to 1.115 g/cm³.

TABLE 3

| | Reference Secondary Coating | Reference Primary Coating | Sample 1 | Sample 2 | Sample 3 | Sample 4 | Sample 5 | Sample 6 | Sample 7 | Sample 8 | Sample 9 | Sample 10 |
|---|---|---|---|---|---|---|---|---|---|---|---|---|
| BR-640D oligomer | | | | 74% | | 72% | | | | | | |
| BR-641D oligomer | | | 64% | | 69% | | 68.5% | 67% | | | | |
| CN307 oligomer | | | | | | | | | 89% | | | |
| CN308 oligomer | | | | | | | | | | 99% | 94% | 89% |
| Isodecyl acrylate | | | 35% | 25% | 30% | | | | 10% | | | |
| Lauryl acrylate | | | | | | 25% | 30% | 30% | | | 5% | 10% |
| Irgacure 1173 photoinitiator | | | 1% | 1% | 1% | 1% | 1% | 1% | 1% | 1% | 1% | 1% |
| Mercaptopropyl trimethoxy silane (MTMO) | | | | | | 2% | 0.50% | 2% | | | | |
| Viscosity at 25° C., centipoise | ~3000 @ 30° C. | ~3300 @ 30° C. | | | 4560 | | | | 2380 | 9120 | | |
| Density, cured (g/cm³) | 1.151 | ~1.050 | 0.944 | 0.940 | 0.926 | 0.914 | 0.908 | 0.900 | 0.944 | 0.877 | 0.900 | 0.911 |
| Elastic modulus at 23° C. (MPa) | 1220 | 1.02 | | | | 0.885 | 0.593 | | | 4.10 | | |
| Refractive index, cured | | | | | | | | | | | | |
| At wavelength 633 nm | 1.5063 | 1.4995 | | | | 1.4842 | 1.4803 | | | 1.4841 | | |
| At wavelength 790 nm | 1.5023 | 1.4948 | | | | 1.4800 | 1.4781 | | | 1.4800 | | |
| At wavelength 1538 nm | 1.4882 | 1.4873 | | | | 1.4742 | 1.4708 | | | 1.4749 | | |

TABLE 4

| Fiber Design | Outer diameter (microns) | | | Component density (g/cm³) | | | Fiber density (g/cm³) |
|---|---|---|---|---|---|---|---|
| | Glass | Primary | Secondary | Glass | Primary | Secondary | |
| 1 | 50 | 150 | 250 | 2.200 | 0.900 | 1.150 | 1.112 |
| 2 | 50 | 150 | 250 | 2.200 | 0.930 | 1.150 | 1.122 |
| 3 | 50 | 170 | 250 | 2.200 | 0.930 | 1.150 | 1.099 |
| 4 | 50 | 190 | 250 | 2.200 | 0.930 | 1.150 | 1.074 |
| 5 | 50 | 190 | 250 | 2.200 | 0.950 | 0.950 | 1.000 |
| 6 | 80 | 190 | 250 | 2.200 | 0.900 | 1.150 | 1.139 |
| 7 | 80 | 190 | 250 | 2.200 | 0.950 | 1.150 | 1.162 |
| 8 | 80 | 230 | 250 | 2.200 | 0.950 | 1.150 | 1.109 |
| 9 | 80 | 230 | 250 | 2.200 | 0.950 | 0.950 | 1.078 |
| 10 | 80 | 250 | 300 | 2.200 | 0.950 | 1.150 | 1.100 |
| 11 | 80 | 280 | 300 | 2.200 | 0.930 | 1.150 | 1.049 |
| 12 | 80 | 280 | 300 | 2.200 | 0.910 | 1.150 | 1.033 |
| Reference 1 | 80 | 130 | 165 | 2.200 | 1.050 | 1.150 | 1.358 |
| Reference 2 | 80 | 230 | 250 | 2.200 | 1.050 | 1.150 | 1.183 |
| Reference 3 | 125 | 195 | 250 | 2.200 | 1.050 | 1.150 | 1.377 |

TABLE 5

| Fiber draw trial | Fiber draw tower | Coating recipe from Table 3 | Target diameter, glass cladding (micrometers) | Measured diameter, primary coating (micrometers) | Measured diameter, secondary coating (micrometers) | Measured fiber density (g/cm³) |
|---|---|---|---|---|---|---|
| 1 | 1 | Sample 5 | 80 | 207.8 | 249.9 | 1.115 |
| 2 | 1 | Sample 5 | 80 | 206.7 | 250.4 | 1.115 |
| 3 | 1 | Sample 8 | 80 | 215.0 | 253.5 | 1.085 |
| 4 | 1 | Sample 8 | 80 | 217.0 | 253.6 | 1.082 |
| 5 | 2 | Sample 9 | 80 | 220.9 | 258.5 | 1.085 |
| 6 | 2 | Sample 9 | 80 | 215.7 | 257.4 | 1.092 |
| 7 | 2 | Sample 9 | 80 | 216.9 | 247.9 | 1.093 |

From Table 3 it may be seen that all of the cured primary coatings have densities of less than 1.0 g/cm³. The compositions used to manufacture these primary coatings can have a viscosity of 1000 to 10,000 cP at room temperature.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiments disclosed as the best mode contemplated for carrying out this disclosure.

What is claimed is:

1. A composition for coating an optical fiber comprising:
a free radically curable acrylate and/or a methacrylate functionalized oligomer having a density of less than 1.0 g/cm³; where the acrylate and/or the methacrylate functionalized oligomer has a functionality of 1 or more;

a photoinitiator; and optionally a free radically curable acrylate and/or methacrylate diluent monomer that has a density of less than 1.0 g/cm³; where the coating composition is disposed and cured on an optical fiber; where the density of the cured coating is less than 1.0 g/cm³; and where the average functionality of the composition is greater than one; where a cured coating manufactured from the composition has an elastic modulus at 23° C. of 0.3 to 100 megapascals.

2. The composition of claim 1, where the composition has a refractive index greater than silica and a viscosity of 1000 to 100,000 centipoise when measured at room temperature.

3. The composition of claim 1, where the free radically curable acrylate and/or a methacrylate functionalized oligomer comprises a urethane (meth)acrylate, an epoxy (meth)acrylate, a polybutadiene (meth)acrylate, a polybutadiene urethane (meth)acrylate, a polybutadiene epoxy (meth)acrylate, a polyisoprene (meth)acrylate, a polyisoprene urethane (meth)acrylate, a polyisoprene epoxy (meth)acrylate, a hydrocarbon (meth)acrylate, a hydrocarbon urethane (meth)acrylate, a hydrocarbon epoxy (meth)acrylate, a hydrophobic (meth)acrylate ester, a hydrophobic urethane (meth)acrylate ester, a hydrophobic epoxy (meth)acrylate ester, a pentadiene (meth)acrylate, a pentadiene urethane (meth)acrylate, a pentadiene epoxy (meth)acrylate, or a combination thereof.

4. The composition of claim 1, where the free radically curable acrylate and/or a methacrylate functionalized oligomer comprises a backbone that comprises a polybutadiene, a substituted polybutadiene, a polyisoprene, a polypentadiene, a polycyclopentadiene, hydrogenated variants of the foregoing dialkene oligomers, polyisobutylene, or a combination thereof.

5. The composition of claim 1, where the free radically curable acrylate and/or a methacrylate functionalized oligomer comprises at least one of the structures of formulas (1)-(10)

(1)
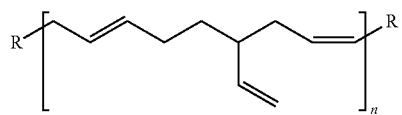

(2)
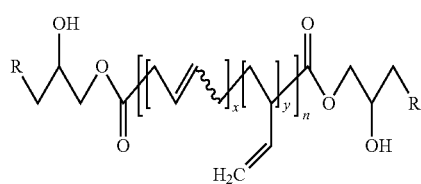

(3)
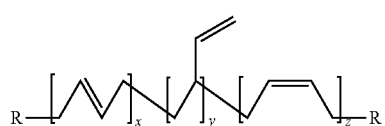

(4)
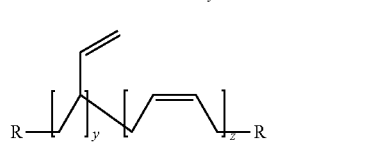

(5)

-continued (6)
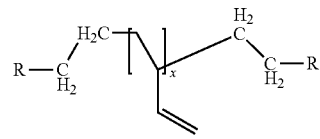

(7)
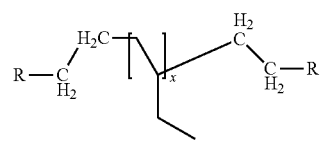

(8)
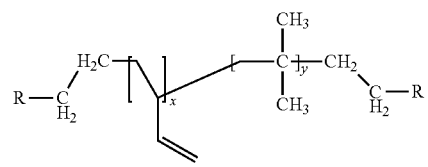

(9)
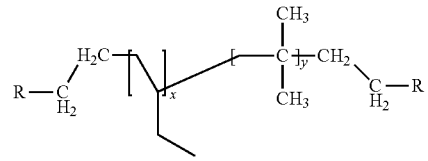

(10)
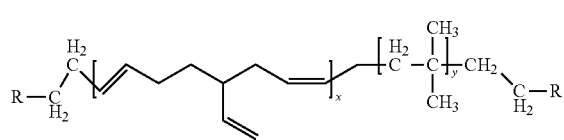

where in formulas (1)-(10), R has a structure represented by formulas (11)-(13) below

(11)
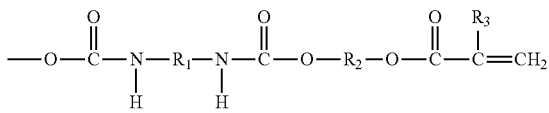

(12)
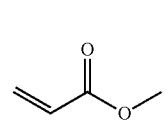

(13)
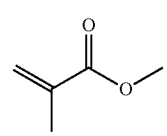

where $R_1$ and $R_2$ are independently a $C_{2-10}$ alkyl, branched alkyl, cycloaliphatic group, an aromatic group one or more of the carbon atoms are substituted, $R_3$ is a hydrogen or a methyl group.

6. The composition of claim 5, where R has the structure

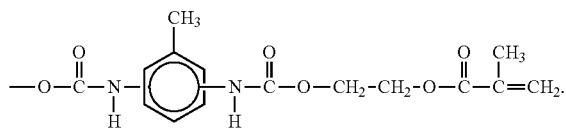

7. The composition of claim 1, where the acrylate oligomer is a polybutadiene diacrylate oligomer or a polybutadiene urethane acrylate oligomer.

8. The composition of claim 1, where the acrylate or methacrylate oligomers are present in amounts of 60 to 99 wt %, based on the total weight of the composition prior to curing.

9. The composition of claim 1, where the acrylate and/or methacrylate diluent monomers are compatible in a liquid phase with the acrylate and/or methacrylate oligomers.

10. The composition of claim 1, wherein a ratio of methacrylate to acrylate functionalities is less than 0.5.

11. The composition of claim 9, where the acrylate and methacrylate diluent monomers comprise alkyl acrylate and alkyl methacrylate monomers respectively.

12. The composition of claim 9, where the alkyl acrylate and alkyl methacrylate diluent monomers comprise alkyl chains that are linear or branched.

13. The composition of claim 12, where the alkyl chains are selected from the group consisting of octyl, nonyl, decyl, undecyl, dodecyl, isooctyl, isodecyl, tridecyl, and lauryl.

14. The composition of claim 9, where the acrylate and/or methacrylate diluent monomers are present in amounts of 1 to 40 wt %, based on the total weight of the composition prior to curing.

15. An article comprising the composition of claim 1.

16. The article of claim 15 where the article is an optical fiber.

17. A method comprising:
 disposing onto an optical fiber the composition of claim 1 comprising:
  a free radically curable acrylate and/or a methacrylate functionalized oligomer; a photoinitiator; and optionally a free radically curable acrylate and/or methacrylate diluent monomer; where the coating composition is disposed and cured on an optical fiber; and where the average functionality of the composition is greater than one; and
 curing the composition using ultraviolet radiation to produce a coating that has a density of less than 1.0 g/cm$^3$.

18. The method of claim 17, where the primary coating has an elongation at break of greater than 15% and an elastic modulus of 0.3 to 100 megapascals.

19. The method of claim 18, where the primary coating has an elastic modulus of 1 to 10 megapascals.

20. The method of claim 17, further comprising disposing on the coating another UV curable coating or an extruded thermoplastic buffer.

21. The method of claim 17, where the coating has a thickness on the optical fiber of less than 135 micrometers.

22. An optical fiber manufactured according to the method of claim 17.

* * * * *